United States Patent
Smith et al.

(10) Patent No.: US 6,361,843 B1
(45) Date of Patent: Mar. 26, 2002

(54) MULTILAYERED POLYMER STRUCTURE FOR MEDICAL PRODUCTS

(75) Inventors: Sidney T. Smith, Lake Forest; Larry A. Rosenbaum, Gurnee; Steven Giovanetto, Vernon Hills, all of IL (US); Bradley Buchanan, Ross, CA (US); Y. Samuel Ding, Vernon Hills; Suchuan C. Fan, Libertyville, both of IL (US); Gregg Nebgen, Burlington, WI (US)

(73) Assignee: Baxter International Inc., Deerfield, IL (US)

( * ) Notice: Subject to any disclaimer, the term of this patent is extended or adjusted under 35 U.S.C. 154(b) by 0 days.

(21) Appl. No.: 09/607,058

(22) Filed: Jun. 29, 2000

Related U.S. Application Data

(63) Continuation of application No. 08/934,924, filed on Sep. 22, 1997, now Pat. No. 6,083,587.

(51) Int. Cl.⁷ .................................................. B32B 1/08
(52) U.S. Cl. ..................... 428/36.6; 428/36.7; 428/332; 428/343; 428/474.4; 428/476.3; 428/500; 428/515; 428/518
(58) Field of Search ................ 428/36.6, 36.7, 428/343, 332, 474.4, 476.3, 500, 515, 518

(56) References Cited

U.S. PATENT DOCUMENTS

| | | | |
|---|---|---|---|
| 3,536,693 A | 10/1970 | Schrader et al. | 526/65 |
| 3,955,040 A | 5/1976 | Schirmer | 428/475.8 |
| 4,064,296 A | 12/1977 | Bornstein et al. | 428/34.9 |
| 4,082,854 A | 4/1978 | Yamada et al. | 426/106 |
| 4,082,877 A | 4/1978 | Shadle | 428/220 |
| 4,095,012 A | 6/1978 | Schirmer | 428/476.1 |
| 4,197,326 A | 4/1980 | Wakamatsu et al. | 426/412 |
| 4,212,956 A | 7/1980 | Katsura | 525/60 |

(List continued on next page.)

FOREIGN PATENT DOCUMENTS

| | | |
|---|---|---|
| EP | 0 230 344 A2 | 7/1987 |
| EP | 0 451 977 A1 | 10/1991 |
| EP | 0 465 428 A1 | 1/1992 |
| EP | 0 504 808 A1 | 9/1992 |
| EP | 0 561 428 A1 | 9/1993 |
| EP | 0 698 487 A1 | 2/1996 |
| GB | 2 131 739 A | 6/1984 |

*Primary Examiner*—Leszek Kiliman
(74) *Attorney, Agent, or Firm*—Mark J. Buonaiuto; Joseph A. Fuchs

(57) ABSTRACT

The present invention provides a multiple layer structure (10) for fabricating medical products. The layer structure (10) has a core layer (14) of an ethylene vinyl alcohol copolymer having an ethylene content of about 25–45 mole percent, a solution contact layer of a polyolefin positioned on a first side of the core layer, an outer layer (12) positioned on a second side of the core layer opposite the solution contact layer (16), the outer layer (12) being selected from the group consisting of polyamides, polyesters and polyolefins; two tie layers (18)—one of each adhered to the first and second sides of the core layer (14) and positioned between the solution contact layer (16) and the core layer (14) and between the outer layer (12) and the core layer (14), and wherein the structure (10) is produced in a cast coextrusion process.

16 Claims, 1 Drawing Sheet

U.S. PATENT DOCUMENTS

| | | | |
|---|---|---|---|
| 4,212,966 A | 7/1980 | McClain | 528/486 |
| 4,220,684 A | 9/1980 | Olson | 383/116 |
| 4,233,367 A | 11/1980 | Ticknor et al. | 428/476.3 |
| 4,239,826 A | 12/1980 | Knott, II et al. | 428/36.7 |
| 4,254,169 A | 3/1981 | Schroeder | 428/36.6 |
| 4,255,490 A | 3/1981 | Katsura | 428/483 |
| 4,281,045 A | 7/1981 | Sumi et al. | 428/516 |
| 4,284,674 A | 8/1981 | Sheptak | 428/69 |
| 4,322,480 A | 3/1982 | Tuller et al. | 428/476.1 |
| 4,349,644 A | 9/1982 | Iwanami et al. | 525/57 |
| 4,350,797 A | 9/1982 | Marzola et al. | 525/253 |
| 4,355,721 A | 10/1982 | Knott, II et al. | 206/524.2 |
| 4,361,628 A | 11/1982 | Krueger et al. | 428/475.8 |
| 4,397,916 A | 8/1983 | Nagano | 428/461 |
| 4,397,917 A | 8/1983 | Chi et al. | 429/26 |
| 4,405,667 A | 9/1983 | Christensen et al. | 428/35.4 |
| 4,407,873 A | 10/1983 | Christensen et al. | 428/35.4 |
| 4,445,550 A | 5/1984 | Davis et al. | 141/329 |
| 4,457,960 A | 7/1984 | Newsome | 428/34.9 |
| 4,460,632 A | 7/1984 | Adur et al. | 428/34.2 |
| 4,464,438 A | 8/1984 | Lu | 428/516 |
| 4,465,487 A | 8/1984 | Nakamura et al. | 604/408 |
| 4,468,427 A | 8/1984 | Degrassi et al. | 428/220 |
| 4,486,497 A | 12/1984 | Mizutani | 428/332 |
| 4,501,798 A | 2/1985 | Koschak et al. | 428/349 |
| 4,528,219 A | 7/1985 | Yamada et al. | 428/36.6 |
| 4,536,409 A | 8/1985 | Farrell et al. | 426/398 |
| 4,536,532 A | 8/1985 | Miller et al. | 524/141 |
| 4,551,371 A | 11/1985 | Eckstein | 222/92 |
| 4,552,714 A | 11/1985 | Kreuger et al. | 264/173.14 |
| 4,552,716 A | 11/1985 | Habich | 264/328.1 |
| 4,552,801 A | 11/1985 | Odozynski et al. | 428/220 |
| 4,561,110 A | 12/1985 | Herbert | 604/408 |
| 4,561,920 A | 12/1985 | Foster | 156/244.11 |
| 4,562,118 A | 12/1985 | Maruhashi et al. | 428/412 |
| 4,572,854 A | 2/1986 | Dallmann et al. | 206/524.1 |
| 4,588,177 A | 5/1986 | White | 265/41 |
| 4,588,648 A | 5/1986 | Krueger et al. | 428/475.8 |
| 4,590,131 A | 5/1986 | Yazaki et al. | 428/516 |
| 4,605,576 A | 8/1986 | Jabarin | 428/36.6 |
| 4,615,922 A | 10/1986 | Newsome et al. | 428/35.4 |
| 4,615,926 A | 10/1986 | Hsu et al. | 428/35.2 |
| 4,617,240 A | 10/1986 | Krueger et al. | 428/476.1 |
| 4,636,412 A | 1/1987 | Field | 604/408 |
| 4,639,398 A | 1/1987 | Bergstrom | 428/451 |
| 4,645,695 A | 2/1987 | Negi et al. | 220/62.22 |
| 4,647,483 A | 3/1987 | Tse et al. | 206/204 |
| 4,650,452 A | 3/1987 | Jensen | |
| 4,650,721 A | 3/1987 | Aschcraft et al. | |
| 4,668,571 A | 5/1987 | Moriarty, Jr. | |
| 4,672,087 A | 6/1987 | Miller et al. | |
| 4,677,017 A | 6/1987 | DeAntonis et al. | |
| 4,684,573 A | 8/1987 | Mueller et al. | |
| 4,684,576 A | 8/1987 | Tabor et al. | |
| 4,695,491 A | 9/1987 | Kondo et al. | |
| 4,702,966 A | 10/1987 | Farrell et al. | |
| 4,705,708 A | 11/1987 | Briggs et al. | |
| 4,724,185 A | 2/1988 | Shah | |
| 4,726,984 A | 2/1988 | Shah | |
| 4,729,476 A | 3/1988 | Lulham et al. | |
| 4,731,266 A | 3/1988 | Bonnebat et al. | |
| 4,746,562 A | 5/1988 | Fant | |
| 4,755,419 A | 7/1988 | Shah | |
| 4,758,463 A | 7/1988 | Vicik et al. | |
| 4,767,651 A | 8/1988 | Starczewski et al. | |
| 4,770,944 A | 9/1988 | Farrell et al. | |
| 4,789,575 A | 12/1988 | Gibbons et al. | |
| 4,808,482 A | 2/1989 | Benge et al. | |
| 4,818,592 A | 4/1989 | Ossian | |
| 4,828,915 A | 5/1989 | Schroeder et al. | |
| 4,839,235 A | 6/1989 | Shah | |
| 4,842,947 A | 6/1989 | Jachec et al. | |
| 4,857,399 A | 8/1989 | Vicik | |
| 4,857,408 A | 8/1989 | Vivik | |
| 4,871,410 A | 10/1989 | Bonnebat et al. | |
| 4,875,587 A | 10/1989 | Lulham et al. | |
| 4,877,662 A | 10/1989 | Yazaki et al. | |
| 4,881,649 A | 11/1989 | Hsu et al. | |
| 4,883,696 A | 11/1989 | Iwanami et al. | |
| 4,902,558 A | 2/1990 | Henricksen | |
| 4,911,963 A | 3/1990 | Lustig et al. | |
| 4,911,979 A | 3/1990 | Nishimoto et al. | |
| 4,917,925 A | 4/1990 | Loretti et al. | |
| 4,929,479 A | 5/1990 | Shishido et al. | |
| 4,950,515 A | 8/1990 | Mason et al. | |
| RE33,376 E | 10/1990 | Gibbons et al. | |
| 4,963,426 A | 10/1990 | Nishimoto et al. | |
| 4,971,864 A | 11/1990 | McCord | |
| 4,983,432 A | 1/1991 | Bissot | |
| 5,004,647 A | 4/1991 | Shah | |
| 5,039,565 A | 8/1991 | Dyerup | |
| 5,040,583 A | 8/1991 | Lin et al. | |
| 5,049,449 A | 9/1991 | Ofstein | |
| 5,053,259 A | 10/1991 | Vicik | |
| 5,077,109 A | 12/1991 | Lustig et al. | |
| 5,085,816 A | 2/1992 | McCord | |
| 5,108,807 A | 4/1992 | Tucker | |
| 5,126,198 A | 6/1992 | Schinkel et al. | |
| 5,129,894 A | 7/1992 | Sommermeyer et al. | |
| 5,132,149 A | 7/1992 | Kotani et al. | |
| 5,137,763 A | 8/1992 | Bauer et al. | |
| 5,141,795 A | 8/1992 | Kai et al. | |
| 5,143,570 A | 9/1992 | Freedmam | |
| 5,156,921 A | 10/1992 | Lin et al. | |
| 5,164,258 A | 11/1992 | Shida et al. | |
| 5,169,697 A | 12/1992 | Langley et al. | |
| 5,171,640 A | 12/1992 | Wirth | |
| 5,183,706 A | 2/1993 | Bekele | |
| 5,186,782 A | 2/1993 | Freedman | |
| 5,206,688 A | 4/1993 | Onishi et al. | |
| 5,208,082 A | 5/1993 | Choue | |
| 5,208,094 A | 5/1993 | Sun | |
| 5,232,754 A | 8/1993 | Waugh | |
| 5,234,731 A | 8/1993 | Ferguson | |
| RE34,537 E | 2/1994 | Deyrup | |
| RE34,546 E | 2/1994 | Deyrup | |
| 5,283,128 A | 2/1994 | Wilhoit | |
| 5,292,590 A | 3/1994 | Lin et al. | |
| 5,300,354 A | 4/1994 | Harita et al. | |
| 5,318,829 A | 6/1994 | Tada et al. | |
| 5,346,732 A | 9/1994 | Lai et al. | |
| 5,348,771 A | 9/1994 | Lee et al. | |
| 5,360,670 A | 11/1994 | Yonezu et al. | |
| 5,362,532 A | 11/1994 | Famili et al. | |
| 5,370,937 A | 12/1994 | Lee et al. | |
| 5,372,669 A | 12/1994 | Freedman | |
| 5,372,880 A | 12/1994 | Lee et al. | |
| 5,374,459 A | 12/1994 | Mumpower et al. | |
| 5,380,586 A | 1/1995 | Knoerzer et al. | |
| 5,407,713 A | 4/1995 | Wilfong et al. | |
| 5,434,007 A | 7/1995 | Yeh | |
| 5,434,010 A | 7/1995 | Smith et al. | |
| 5,462,807 A | 10/1995 | Halle et al. | |
| 5,463,375 A | 10/1995 | Bauer | |
| 5,464,691 A | 11/1995 | Gardiner et al. | |
| 5,466,498 A | 11/1995 | Fortoni et al. | |
| 5,472,792 A | 12/1995 | Tsurutani et al. | |
| 5,482,770 A | 1/1996 | Bekele | |
| 5,482,771 A | 1/1996 | Shah | |
| 5,487,940 A | 1/1996 | Bianchini et al. | |
| 5,489,478 A | 2/1996 | Audry et al. | |

| | | | | | | |
|---|---|---|---|---|---|---|
| 5,491,009 A | 2/1996 | Bekele | | 5,604,042 A | 2/1997 | Bianchini et al. |
| 5,491,011 A | 2/1996 | Pezzoli et al. | | 5,604,043 A | 2/1997 | Ahlgren |
| RE35,285 E | 6/1996 | Quacquarella et al. | | 5,618,599 A | 4/1997 | Nulman et al. |
| 5,534,351 A | 7/1996 | Pearson et al. | | 5,620,758 A | 4/1997 | Babrowski |
| 5,547,764 A | 8/1996 | Blais et al. | | 5,628,629 A | 5/1997 | Mitani et al. |
| 5,547,765 A | 8/1996 | Degrassi et al. | | 5,629,059 A | 5/1997 | Desai et al. |
| 5,552,002 A | 9/1996 | Farrell et al. | | 5,645,906 A | 7/1997 | Park et al. |
| 5,552,212 A | 9/1996 | Knoerzer | | 6,083,587 A * | 7/2000 | Smith ..................... 428/36.6 |
| 5,558,930 A | 9/1996 | DiPoto | | | | |
| 5,559,176 A | 9/1996 | Namba et al. | | * cited by examiner | | |
| 5,562,996 A | 10/1996 | Kuriu et al. | | | | |

MULTILAYERED POLYMER STRUCTURE FOR MEDICAL PRODUCTS

RELATED APPLICATIONS

This is a continuation of U.S. patent application Ser. No. 08/934,924 filed Sep. 22, 1997 now U.S. Pat. No. 6,083,587 which is incorporated herein by reference and made a part hereof.

TECHNICAL FIELD

The present invention relates generally to multilayered polymeric structures for fabricating medical grade products and more specifically five-layered structures for fabricating medical solution containers and medical tubings.

BACKGROUND PRIOR ART

In the medical field, where beneficial agents are collected, processed and stored in containers, transported, and ultimately delivered through tubes by infusion to patients to achieve therapeutic effects, materials which are used to fabricate the containers must have a unique combination of properties. For example, in order to visually inspect solutions for particulate contaminants, the container must be optically transparent. To infuse a solution from a container by collapsing the container walls, without introducing air into the container, the material which forms the walls must be sufficiently flexible to collapse upon draining. The material must be functional over a wide range of temperatures. The material must be capable of withstanding radiation sterilization without degrading its physical properties. The material must function at low temperatures by maintaining its flexibility and toughness as some medical solutions, and blood products are stored and transported in containers at temperatures such as −25 to −30° C.

A further requirement is to minimize the environmental impact upon the disposal of the article fabricated from the material after its intended use. For those articles that are disposed of in landfills, it is desirable to use as little material as possible and avoid the incorporation of low molecular weight leachable components to construct the article. Further benefits are realized by using a material which may be recycled by thermoplastically reprocessing the post-consumer article into other useful articles.

For those containers that are disposed of through incineration, it is necessary to use a material that minimizes or eliminates entirely the formation of inorganic acids which are environmentally harmful, irritating, and corrosive, or other products which are harmful, irritating, or otherwise objectionable upon incineration.

For ease of manufacture into useful articles, it is desirable that the material be sealable using radio frequency ("RF") sealing techniques generally at about 27.12 MHz. Therefore, the material should possess sufficient dielectric loss properties to convert the RF energy to thermal energy.

It is also desirable that the material be free from or have a low content of low molecular weight additives such as plasticizers, slip agents, stabilizers and the like which could be released into the medications or biological fluids or tissues, contaminating such substances being stored or processed in such devices.

In many medical product applications, it is desirable to provide a multilayered structure that provides a barrier to the passage of oxygen, carbon dioxide, and water. For medical solutions that are packaged having a desired concentration of a drug or solute, the barrier to water helps maintain this concentration by preventing water from escaping from the container. In solutions that have a buffer to prevent pH changes, such as a commonly used sodium bicarbonate buffer, the barrier to carbon dioxide helps maintain the buffer by preventing carbon dioxide from escaping from the container. For medical solutions containing labile species, the oxygen barrier helps prevent the ingress of oxygen which can oxidize proteins or amino acids rendering the solution ineffective for its intended purpose.

Ethylene vinyl alcohol (EVOH) is known for use as an oxygen barrier in multilayer films. One commercially available EVOH layered structure is sold by Barrier Film Corporation under the product designation BF-405 for thermoforming into food packaging. It is believed that the BF-405 film has an outer layer of nylon, a core layer of EVOH and an inner layer of a metallocene-catalyzed ultra-low density polyethylene. These layers are formed into a layered structure or film by a blown film process. This film has an oxygen transmission rate, for a film 2.6 mils in thickness, of 0.05 cc/100 sq.in./24 hrs.

The BF-405 film is unacceptable for medical applications as slip agents must be used during the processing of the film. Such slip agents include low molecular weight components that are soluble in water and are capable of leaching out into the medical solution which it contacts. Thus, if such film were constructed into a medical container and filled with a medical solution, it would likely lead to an unacceptably high extractable content in the contained medical solution.

There are numerous U.S. patents that disclose EVOH barrier films. For example, U.S. Pat. No. 4,254,169 provides barrier films having layers of EVOH and polyolefins. The '169 Patent discloses an adhesive for bonding the EVOH to polyolefins which includes a high density polyethylene grafted with a fused-ring carboxylic acid anhydride blended with an unmodified polyolefin. (Col. 2, line 65–col. 3, line 21). In many of the examples, the '169 Patent discloses adding a slip agent to make the outer surface of the films more slippery. (See Tables I and II and col. 5, lines 35–37).

U.S. Pat. No. 4,397,916 discloses multilayered EVOH structures in which the EVOH is attached to other layers such as polyolefins by a layer of a graft-modified ethylene resin grafted with a carboxylic acid or a functional derivative thereof. The '916 Patent also provides for attaching nitrogen containing polymers such as nylons to polyolefins with the graft modified ethylene resins. The '916 Patent does not discuss limiting low molecular weight additives to reduce the amount of extractables. In fact the '916 encourages the use of slip agents, lubricants, pigments, dyes and fillers (Col. 6, lines 38–42) which could have a deleterious impact on the amount of extractables and on the optical transparency of the polymer blend.

U.S. Pat. No. 5,164,258 discloses a multilayered structure containing EVOH as a barrier layer sandwiched between two layers of polyolefins. The polyolefin layers are intended to facilitate the escape of moisture which becomes absorbed in the barrier layer during a steam sterilization process. The polyolefin layers are attached to the EVOH layer with, for example, a maleic anhydride graft-modified polyethylene adhesive. The '258 Patent discloses increasing the WVTR of one of the polyolefin layers by adding organic and inorganic fillers to the layer. (Col. 4, lines 22–59). These fillers are likely to render the multilayered structure optically opaque.

The present invention is provided to solve these and other problems.

SUMMARY OF THE INVENTION

The present invention provides multilayered, flexible, barrier structures that are suitable for forming medical products. The multiple layer structure comprises (I) a core layer of a vinyl alcohol copolymer, such as ethylene vinyl alcohol (EVOH), having an ethylene content of from 25–45 mole percent;

(II) a solution contact layer of a polyolefin positioned on a first side of the core layer;

(III) an outer layer positioned on a second side of the core layer opposite the solution contact layer, the outer layer being selected from the group consisting of polyamides, polyesters and polyolefins;

(IV) a tie layer adhered to each of the first and second sides of the core layer and positioned between the solution contact layer and the core layer and between the outer layer and the core layer; and wherein the structure has a low molecular weight water soluble fraction of the composition of less than 1.0 part per thousand (ppt).

It is also preferred that the multilayered structure have the following physical properties: a mechanical modulus as measured by ASTM D 638 of less than 50,000 psi, more preferably less than 40,000 psi and most preferably from 35,000–40,000 or any range or combination of ranges therein. When fabricated into containers and used to store medical liquids, the total organic carbon that leaches out from the layered structure to the solution is less than 1.0 ppt, more preferably less than 100 ppm and most preferably less than 10 ppm. Preferably the layered structure has an oxygen permeability of less than 0.2 cc/100 sq.in./24 hrs.

Preferably the layered structure is formed using a cast coextrusion process that obviates the needs for slip agents and other low molecular weight additives.

DETAILED DESCRIPTION

While this invention is susceptible of embodiments in many different forms, and will herein be described in detail, preferred embodiments of the invention are disclosed with the understanding that the present disclosure is to be considered as exemplifications of the principles of the invention and are not intended to limit the broad aspects of the invention to the embodiments illustrated.

According to the present invention, multiple layered film structures are provided which meet the requirements set forth above.

Figure 1:
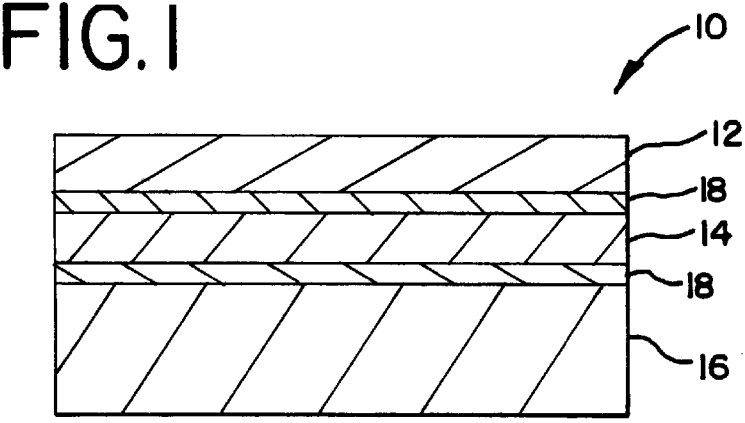
FIG. 1 shows a cross-sectional view of a five layered film structure of the present invention.

FIG. 1 shows a five layered film structure 10 having an outer layer 12, a core layer 14, an inner or solution contact layer 16 and two tie layers 18. One of each of the tie layers 18 is located between the core layer 14 and the outer layer 12 and the inner layer 16 and the core layer 14.

The core layer 14 is an ethylene vinyl alcohol copolymer having an ethylene content of from about 25–45 mole percent (ethylene incorporated, as specified in EVALCA product literature). Kuraray Company, Ltd. produces EVOH copolymers under the tradename EVAL® which have about 25–45 mole percent of ethylene, and a melting point of about 150–195° C. Most preferably the EVOH has a ethylene content of 32 mole percent.

The outer layer preferably is a polyamide, polyester, polyolefin or other material that aids in the escape of water away from the core layer. Acceptable polyamides include those that result from a ring-opening reaction of lactams having from 4–12 carbons. This group of polyamides therefore includes nylon 6, nylon 10 and nylon 12. Most preferably, the outer layer is a nylon 12.

Acceptable polyamides also include aliphatic polyamides resulting from the condensation reaction of di-amines having a carbon number within a range of 2–13, aliphatic polyamides resulting from a condensation reaction of di-acids having a carbon number within a range of 2–13, polyamides resulting from the condensation reaction of dimer fatty acids, and amide containing copolymers. Thus, suitable aliphatic polyamides include, for example, nylon 66, nylon 6,10 and dimer fatty acid polyamides.

Suitable polyesters for the outer layer include polycondensation products of di-or polycarboxylic acids and di or poly hydroxy alcohols or alkylene oxides. Preferably, the polyesters are a condensation product of ethylene glycol and a saturated carboxylic acid such as ortho or isophthalic acids and adipic acid. More preferably the polyesters include polyethyleneterephthalates produced by condensation of ethylene glycol and terephthalic acid; polybutyleneterephthalates produced by a condensations of 1,4-butanediol and terephthalic acid; and polyethyleneterephthalate copolymers and polybutyleneterephthalate copolymers which have a third component of an acid component such as phthalic acid, isophthalic acid, sebacic acid, adipic acid, azelaic acid, glutaric acid, succinic acid, oxalic acid, etc.; and a diol component such as 1,4-cyclohexanedimethanol, diethyleneglycol, propyleneglycol, etc. and blended mixtures thereof.

Suitable polyolefins for the outer layer are the same as those specified for the inner layer set forth below. Preferably a polypropylene is used.

It is well known that the oxygen barrier properties of EVOH are adversely impacted upon exposure to water. Thus, it is important to keep the core layer dry. To this end, the outer layer should assist in the removal of water that makes its way to the core layer through the inner layer or otherwise to maintain the oxygen barrier properties of the core layer.

The inner layer is preferably selected from homopolymers and copolymers of polyolefins. Suitable polyolefins are selected from the group consisting of homopolymers and copolymers of alpha-olefins containing from 2 to about 20 carbon atoms, and more preferably from 2 to about 10 carbons. Therefore, suitable polyolefins include polymers and copolymers of propylene, ethylene, butene-1, pentene-1, hexene-1, heptene-1, octene-1, nonene-1 and decene-1. Suitable polyolefins further include lower alkyl and lower alkene acrylates and acetates and ionomers thereof. The term "lower alkyl" means alkyl groups having 1–5 carbon atoms such as ethyl, methyl, butyl and pentyl. The term "ionomer" is used herein to refer to metal salts of the acrylic acid copolymers having pendent carboxylate groups associated with monovalent or divalent cations such as zinc or sodium.

Most preferably, the inner layer is selected from ethylene α-olefin copolymers especially ethylene-butene-1 copolymers which are commonly referred to as ultra-low density polyethylenes (ULDPE). Preferably the ethylene α-olefin copolymers are produced using metallocene catalyst systems. Such catalysts are said to be "single site" catalysts because they have a single, sterically and electronically equivalent catalyst position as opposed to the Ziegler-Natta type catalysts which are known to have a mixture of catalysts sites. Such metallocene catalyzed ethylene α-olefins are sold by Dow under the tradename AFFINITY, and by Exxon under the tradename EXACT. The ethylene α-olefins preferably have a density from 0.880–0.910 g/cc.

Suitable tie layers include modified polyolefins blended with unmodified polyolefins. The modified polyolefins are typically polyethylene or polyethylene copolymers. The polyethylenes can be ULDPE, low density (LDPE), linear low density (LLDPE), medium density polyethylene (MDPE), and high density polyethylenes (HDPE). The modified polyethylenes may have a density from 0.850–0.95 g/cc.

The polyethylene may be modified by grafting with carboxylic acids, and carboxylic anhydrides. Suitable grafting monomers include, for example, maleic acid, fumaric acid, itaconic acid, citraconic acid, allylsuccinic acid, cyclohex-4-ene-1,2-dicarboxylic acid, 4-methylcyclohex-4-ene-1,2-dicarboxylic acid, bicyclo[2.2.1]hept-5-ene-2,3-dicarboxylic acid, x-methylbicyclo[2.2.1]hept-5-ene-2,3-dicarboxylic acid, maleic anhydride, itaconic anhydride, citraconic anhyride, allylsuccinic anhydride, citraconic anhydride, allylsuccinic anhydride, cyclohex-4-ene-1,2-dicarboxylic anhydride, 4-methylcyclohex-4-ene-1,2-dicarboxylic anhydride, bicyclo[2.2.1]hept-5-ene2,3-dicarboxylic anhydride, and x-methylbicyclo[2.2.1]hept-5-ene-2,2-dicarboxylic anhydride.

Examples of other grafting monomers include $C_1$–$C_8$ alkyl esters or glycidyl ester derivatives of unsaturated carboxylic acids such as methyl acrylate, methyl methacrylate, ethyl acrylate, ethyl methacrylate, butyl acrylate, butyl methacrylate, glycidyl acrylate, glycidal methacrylate, monoethyl maleate, diethyl maleate, monomethyl maleate, diethyl maleate, monomethyl fumarate, dimethyl fumarate, monomethyl itaconate, and diethylitaconate; amide derivatives of unsaturated carboxylic acids such as acrylamide, methacrylamide, maleicmonoamide, maleic diamide, maleic N-monoethylamide, maleic N,N-dietylamide, maleic N-monobutylamide, maleic N,N dibutylamide, fumaric monoamide, fumaric diamide, fumaric N-monoethylamide, fumaric N,N-diethylamide, fumaric N-monobutylamide and fumaric N,N-dibutylamide; imide derivatives of unsaturated carboxylic acids such as maleimide, N-butymaleimide and N-phenylmaleimide; and metal salts of unsaturated carboxylic acids such as sodium acrylate, sodium methacrylate, potassium acrylate and potassium methacrylate. More preferably, the polyolefin is modified by a fused ring carboxylic anhydride and most preferably a maleic anhydride.

The unmodified polyolefins can be selected from the group consisting of ULDPE, LLDPE, MDPE, HDPE and polyethylene copolymers with vinyl acetate and acrylic acid. Suitable modified polyolefin blends are sold, for example, by DuPont under the tradename BYNEL®, by Chemplex Company under the tradename PLEXAR®, and by Quantum Chemical Co. under the tradename PREXAR.

As can be seen in FIG. 1, the preferred multilayered structure is asymmetrical about the core layer 14. That is to say, the solution contact layer 16 is thicker than the outer layer 12. It is well known that EVOH is hygroscopic. As the EVOH absorbs water its oxygen barrier properties are significantly reduced. The preferred structure 10 provides a relatively thin outer layer of a polyamide that assists in the escape of water away from the core layer 14. The solution contact layer 16 is a relatively thick layer of a polyolefin which has good water vapor barrier properties and serves to protect the core layer 14 from the ingress of water.

The relative thicknesses of the layers of the structure 10 is as follows: the core layer should have a thickness from 0.2–2.5 mil, more preferably from 0.7–1.3 mil or any range or combination of ranges therein. The outer layer 12 preferably has a thickness from 0.2–2.0 mil and more preferably 0.4–0.8 mil, or any range or combination of ranges therein. The inner layer 16 has a thickness from 3–8 mil and more preferably from 5–7 mil or any range or combination of ranges therein. The tie layers 18 preferably have a thickness from 0.2–1.2 mils and more preferably 0.6–0.8 mils. Thus, the overall thickness of the layered structure will be from 3.8 mils–14.9 mils.

Figure 2:
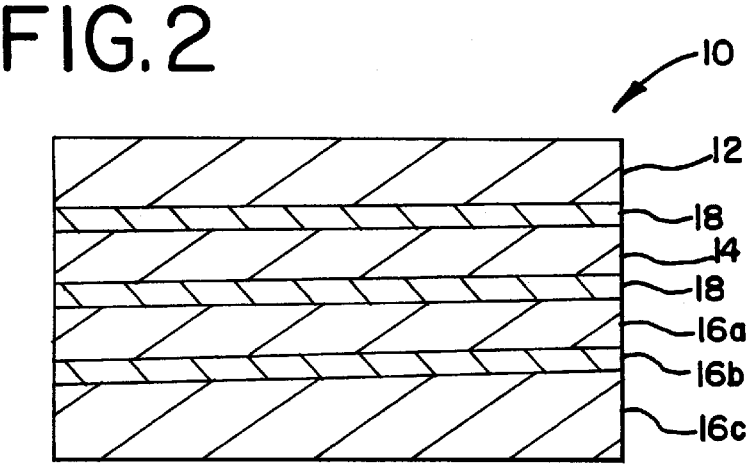
FIG. 2 shows another embodiment of the present invention.

FIG. 2 shows an alternative embodiment having seven layers. This embodiment is the same as that in FIG. 1 with the exception that the solution contact layer 16 is divided into three sublayers 16a, b and c. Preferably the centrally disposed sublayer 16b of the solution contact 16 has a lower WVTR than its flanking sublayers 16a and 16c. Most preferably sublayers 16a and 16c are metallocene-catalyzed ULDPE and the central sublayer 16b is a metallocene-catalyzed low-density polyethylene. Preferably the flanking solution contact sublayers 16a and 16c have thicknesses of about 1 to 7 times, more preferably 2–6 times and most preferably 5 times thicker than the central sublayer 16b. Preferably the flanking solution contact sublayers 16a and 16c will have a thickness of from about 1–5 mils and most preferably 2.5 mils and the central solution contact layer 16b will have a thickness of about 0.2–1 mils and most preferably 0.5 mils.

Figure 3:
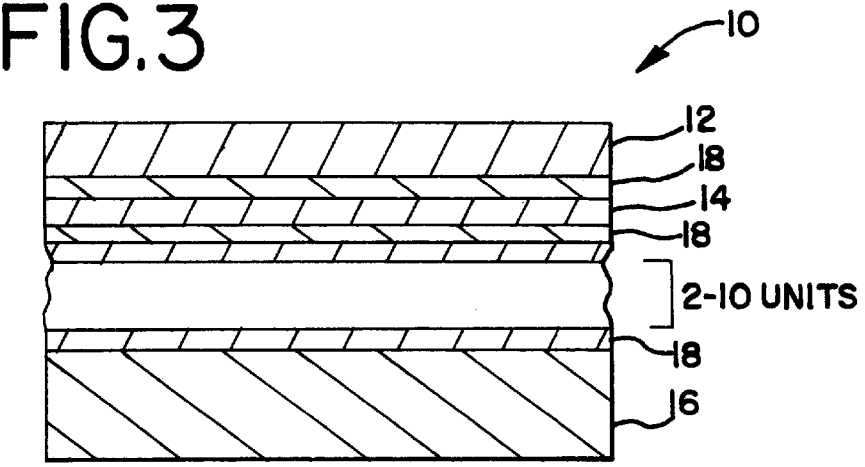
FIG. 3 shows yet another embodiment of the present invention.

FIG. 3 shows another alternative embodiment that is the same in all respects to the multilayered structure of FIG. 1 with the exception that the core layer 14 comprises a plurality of thin core sublayers. Preferably there are anywhere from 2–10 core sublayers. It may also be desirable to incorporate tie sublayers in between each of the core sublayers. The tie sublayers may be selected from those set forth above for bonding the inner and outer layers to the core layer.

The layered structures of the present invention are well suited for fabricating medical containers as they can be fabricated into containers and store medical solutions for extended periods of time without having large quantities of low molecular weight components migrating from the layered structure to the contained solution. For a 450 $cm^2$ surface area container containing 250 ml of saline for seven days, preferably, the quantity of low molecular weight additives, as measured by total organic carbon (TOC), will be less than 1.0 ppt, more preferably less than 100 ppm and most preferably less than 10 ppm.

The above layers may be processed into a layered structure by standard techniques well known to those of ordinary skill in the art and including cast coextrusion, coextrusion coating, or other acceptable process. For ease of manufacture into useful articles, it is desirable that the layered structure can be welded using radio frequency ("RF") welding techniques generally at about 27.12 MHz. Therefore, the material should possess sufficient dielectric loss properties to convert the RF energy to thermal energy. Preferably, the outer layer 12 of the layered structure will have a dielectric loss of greater than 0.05 at frequencies within the range of 1–60 MHz within a temperature range of ambient to 250° C.

Preferably, the layered structure is fabricated into films using a cast coextrusion process. The process should be essentially free of slip agents and other low molecular weight additives that may increase the extractables to an unacceptable level.

An illustrative, non-limiting example of the present multilayered structures is set out below. Numerous other examples can readily be envisioned in light of the guiding principles and teachings contained herein. The example given herein is intended to illustrate the invention and not in any sense to limit the manner in which the invention can be practiced.

EXAMPLE

A five-layered structure was coextruded in accordance with the teachings of the present invention. The five-layered structure had an outer layer of nylon 12 (EMS America Grilon-Grilamid L20) having a thickness of 0.6 mil, a tie layer (BYNEL® 4206 (DuPont)) having a thickness of 0.7 mil, a core layer of EVOH (EVAL® EVOH LC-F101AZ) having a thickness of 1.0 mil, and a ULDPE (Dow AFFINITY® PL1880) having a thickness of 6.0 mil. The structure was radiation sterilized using a cobalt source at a dosage of 40–45 kGys.

The table below shows how the oxygen permeability of the structure depends on temperature. The oxygen permeability was measured using a MoCon tester (Modern Controls, Minneapolis, Minn.). The test chamber had a relative humidity of 75% on the $O_2$ side and a 90% relative humidity on the $N_2$ side to replicate a solution filled container in a high humidity environment.

| TEMPERATURE ° C. | $O_2$ PERMEABILITY cc/100 in$^2$/day |
| --- | --- |
| 8 | 0.002 |
| 15 | 0.003 |
| 22 | 0.018 |
| 30 | 0.046 |
| 40 | 0.156 |

The water vapor transmission rate was also measured at 23° C. and at a humidity gradient of 90% yielding a WVTR of 0.035 g $H_2O$/100 in$^2$/day.

It will be understood that the invention may be embodied in other specific forms without departing from the spirit or central characteristics thereof. The present example and embodiments, therefore, are to be considered in all respects as illustrative and not restrictive, and the invention is not to be limited to the details given herein.

What is claimed is:

1. A multiple layer structure for fabricating medical products comprising:
   a core layer of an ethylene vinyl alcohol copolymer having an ethylene content of about 25–45 mole percent;
   a solution contact layer of a polyolefin positioned on a first side of the core layer;
   an outer layer positioned on a second side of the core layer opposite the solution contact layer, the outer layer being selected from the group consisting of polyamides, polyesters and polyolefins;
   two tie layers, one of each adhered to the first and second sides of the core layer and positioned between the solution contact layer and the core layer and between the outer layer and the core layer; and
   wherein the structure is produced in a cast coextrusion process.

2. The structure of claim 1 wherein the polyamide is selected from aliphatic polyamides resulting from the condensation reaction of di-amines having a carbon number within a range of 2–13, aliphatic polyamides resulting from a condensation reaction of di-acids having a carbon number within a range of 2–13, polyamides resulting from the condensation reaction of dimer fatty acids, and amide containing copolymers.

3. The structure of claim 1 wherein the polyamide is selected from the group of polyamides produced in a ring-opening reaction of lactams having from 4–12 carbons.

4. The structure of claim 3 wherein the polyamide is nylon 12.

5. The structure of claim 1 wherein the polyolefin of the solution contact layer is selected from the group consisting of homopolymers and copolymers of alpha-olefins containing from 2 to about 20 carbon atoms.

6. The structure of claim 5 wherein the polyolefin of the solution contact layer is a homopolymer or a copolymer of an alpha-olefin having from 2 to about 10 carbons.

7. The structure of claim 6 wherein the polyolefin is selected from the group consisting of ethylene copolymers, and butene-1 copolymers.

8. The structure of claim 7 wherein the ethylene copolymer of the solution contact layer is an ethylene-butene-1 copolymer.

9. The structure of claim 8 wherein the ethylene copolymer of the solution contact layer is produced using a metallocene catalyst.

10. The structure of claim 1 wherein the tie layer is a polyolefin polymer or copolymer blended with a polyethylene copolymer grafted with a carboxylic acid anhydride or a carboxylic acid.

11. The structure of claim 10 wherein the carboxylic acid anhydride is an unsaturated flised ring carboxylic acid anhydride.

12. The structure of claim 11 wherein the carboxylic acid anhydride is a maleic anhydride.

13. The structure of claim 1 wherein the low molecular weight water soluble fraction of the structure is less than 1.0 ppt as measured for a container having a surface area of 450 cm$^2$ and containing 250 ml of saline solution.

14. The structure of claim 1 wherein the low molecular weight water soluble fraction of the structure is less than 100 ppm as measured for a container having a surface area of 450 cm$^2$ and containing 250 ml of saline solution.

15. The structure of claim 1 wherein the low molecular weight water soluble fraction of the structure is less than 10 ppm as measured for a container having a surface area of 450 cm$^2$ and containing 250 ml of saline solution.

16. The structure of claim 1 wherein the solution contact layer is from about 3–8 mils thick, the core layer is from about 0.2–2.5 mils thick, the outer layer is from about 0.2–2.0 mils thick, and the tie layers are from 0.2–1.2 mils thick to define an asymmetrical structure about the core layer.

* * * * *